(12) United States Patent
Jeong (10) Patent No.: US 8,806,448 B2
(45) Date of Patent: Aug. 12, 2014

(54) DYNAMIC INSTRUMENTATION METHOD AND APPARATUS FOR TRACING AND ANALYZING A PROGRAM

(75) Inventor: Jae-Hoon Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 13/117,809

(22) Filed: May 27, 2011

(65) Prior Publication Data

US 2012/0054723 A1 Mar. 1, 2012

(30) Foreign Application Priority Data

Aug. 27, 2010 (KR) ......................... 10-2010-0083556

(51) Int. Cl.
*G06F 9/45* (2006.01)

(52) U.S. Cl.
USPC ............................. 717/129; 717/124; 717/130

(58) Field of Classification Search
USPC .................................................. 717/124–131
See application file for complete search history.

(56) References Cited

U.S. PATENT DOCUMENTS

| | | | | |
|---|---|---|---|---|
| 5,265,254 A * | 11/1993 | Blasciak et al. | | 717/130 |
| 5,774,724 A * | 6/1998 | Heisch | | 717/129 |
| 6,698,012 B1 * | 2/2004 | Kossatchev et al. | | 717/126 |
| 6,848,097 B1 * | 1/2005 | Alverson et al. | | 717/124 |
| 6,941,545 B1 * | 9/2005 | Reese et al. | | 717/130 |
| 7,000,225 B2 * | 2/2006 | Sangavarapu et al. | | 717/129 |
| 7,047,521 B2 * | 5/2006 | Bunnell | | 717/130 |
| 7,194,732 B2 * | 3/2007 | Fisher et al. | | 717/131 |
| 7,260,815 B1 * | 8/2007 | Chen et al. | | 717/134 |
| 7,428,727 B2 * | 9/2008 | Alverson et al. | | 717/134 |
| 7,487,502 B2 * | 2/2009 | Wang et al. | | 718/102 |
| 7,543,186 B2 | 6/2009 | Schultz | | |
| 7,661,035 B2 * | 2/2010 | DeWitt et al. | | 714/45 |
| 7,823,129 B2 * | 10/2010 | Dimpsey et al. | | 717/124 |
| 7,823,135 B2 * | 10/2010 | Horning et al. | | 717/127 |
| 7,950,004 B2 * | 5/2011 | Vieira et al. | | 717/125 |
| 8,010,949 B2 * | 8/2011 | Barsness et al. | | 717/129 |
| 8,015,552 B1 * | 9/2011 | Lindahl et al. | | 717/128 |
| 8,136,097 B2 * | 3/2012 | Konishi et al. | | 717/129 |
| 8,578,340 B1 * | 11/2013 | Daudel et al. | | 717/129 |
| 2002/0152455 A1 | 10/2002 | Hundt et al. | | |
| 2010/0095281 A1 | 4/2010 | Raber | | |

FOREIGN PATENT DOCUMENTS

KR 10-2003-0088523 11/2003

OTHER PUBLICATIONS

Lerner et al, "Exception Handling Patterns for Processes", ACM, pp. 55-61, 2008.*

(Continued)

*Primary Examiner* — Anil Khatri
(74) *Attorney, Agent, or Firm* — NSIP Law (57) ABSTRACT

An apparatus and method for dynamically analyzing a program are provided. The apparatus and method help minimize overhead in tracing the execution of the program without substantially affecting the operation of the program at run time. The method includes storing an environment value before execution of a function of a main page by storing a first instruction of the function in a temporary page before execution of the first instruction. The method also includes inserting a break instruction at an address of the first instruction in the main page, executing the break instruction, and storing an environment value after execution of the function by executing a break instruction of the temporary page.

17 Claims, 11 Drawing Sheets

(56) References Cited

OTHER PUBLICATIONS

Bertoncello et al, "Explicit Exception Handling Variability in Component-based Product Line Architectures", ACM, pp. 47-54, 2008.*

Jiang et al, "An Efficient and Reliable Object-Oriented Exception Handling Mechanism", ACM, vol. 40(2), pp. 27-32, 2005.*

Montenegro et al, "Shape Analysis in a Functional Language by Using Regular Languages" ACM, pp. 251-262, 2013.*

* cited by examiner

FIG. 4

DYNAMIC INSTRUMENTATION METHOD AND APPARATUS FOR TRACING AND ANALYZING A PROGRAM

CROSS-REFERENCE TO RELATED APPLICATION

This application claims the benefit under 35 U.S.C. §119(a) of Korean Patent Application No. 10-2010-0083556, filed on Aug. 27, 2010, the disclosure of which is incorporated by reference in its entirety for all purposes.

BACKGROUND

1. Field

The following description relates to the execution trace and analysis of a program, and more particularly, to a method and apparatus for dynamically tracing and analyzing a program without substantially affecting the operation of the program at run time.

2. Description of the Related Art

Dynamic analysis of a program is analysis of a program at run time without altering code of the program and substantially affecting the program at run time. A number of methods may be employed to detect errors or performance degradation when a program runs on a system. According to one method of detecting errors or performance gradation of a program at run time, a break instruction is inserted within instructions of a program needing to be traced and a trace program of detecting an operation of an Operating System (OS) resulted from the insertion of the break instruction is executed.

Representative examples of the above methods include a single-stepping in line (SSIL) method, and a single-stepping out of line (SSOL) method. According to the SSIL method, an original instruction is moved from an original location to another location in a system memory before a break instruction is inserted, and then returns to its original position in resuming the execution after exception handling. According to the SSOL method, an original instruction is relocated to a predetermined location of a system other than its original location in inserting a break instruction, and may perform the same operation as in its original location after an execution of the break instruction.

However, in performing dynamic analysis of a program using the SSIL method in an operating system, when the analysis proceeds by inserting a break instruction in a program, errors may occur due to a location that does not allow function entry and return. In addition, in using the SSOL method, when an original instruction is stored in an operating system area, an instruction of a program may be executed at an unexpected area. Further, when an original instruction is copied to another area of a program for execution, an address of the program may need to be replaced.

SUMMARY

In one general aspect, there is provided a method of dynamically analyzing a program. The method includes storing an environment value before an execution of a function of a main page is stored by storing a first instruction of the function in a temporary page before execution of the first instruction, inserting a break instruction of the main page at an address of the first instruction in the main page, and executing the break instruction of the main page. The method also includes storing an environment value after the execution of the function is stored by executing a break instruction of the temporary page in return address of the temporary page after a final instruction of the function is executed.

In the method, the first instruction of the function, a transfer instruction, and the break instruction of the temporary page may be sequentially stored and executed in the temporary page. The transfer instruction enables a transfer to an address where a second instruction of the function is stored.

If the break instruction of the main page is executed, a probe handler may be executed by an exception handler in an operating system area to determine and store the environment value of the function.

The first instruction of the function may be stored in the temporary page such that the break instruction of the main page is stored in the main page instead of the first instruction, the break instruction of the main page is executed, and the first instruction stored in the temporary page is executed.

The storing of the environment value before the execution of the function may include storing the first instruction of the function in the temporary page and inserting the break instruction of the main page at the address of the first instruction in the main page, and executing the break instruction of the main page, storing the environment value before execution of the function, and changing a return address of the function to an address of the first function in the temporary page.

The method may include executing the first instruction stored in the temporary page, executing an instruction to transfer to the address where the second instruction of the function is stored, and sequentially executing other instructions of the function after the executing of the second instruction of the function.

The storing of the environment value after execution of the function may include transferring an execution location to the return address according to the final instruction of the function, and determining the environment value after execution of the function in an operating system area as the break instruction of the temporary page is executed, wherein the return address represents an address of the break instruction of the temporary page, after the final instruction of the function is executed.

In another general aspect, there is provided an apparatus for dynamically analyzing a program. The apparatus includes an instruction managing unit and a probe unit. The instruction managing unit is configured to store instructions of a function of a main page in a temporary page, and to insert a break instruction in the temporary page. The probe unit is configured to detect an environment value of the function according to an execution of the break instruction of the temporary page, and to store the detected environment value.

The instruction managing unit may manage the instructions such that a first instruction of the function is stored in the temporary page before execution of the first instruction, a break instruction of the main page is inserted into an address of the first instruction in the main page such that the break instruction of the main page is executed, and a return instruction stored in a return address of the function is executed after a final instruction of the function is executed.

The instruction managing unit may execute an instruction to a transfer to an address where a second instruction of the function is stored after the first instruction stored in the temporary page is executed, and may sequentially execute other instructions of the function after the second instruction of the function is executed.

The probe unit may detect an environment value before execution of the function by executing the break instruction of the main page, and detect an environment value after execution of the function by executing the return instruction stored in the return address of the function.

The instruction managing unit and the probe unit may be implemented by a probe handler that is executed by an exception handler of an operating system area.

In another general aspect, there is provided a method of dynamically analyzing a program. The method includes determining a first environment value, copying a first function instruction from a first address, the first address located in a main page, storing the first function instruction in a second address, the second address located in a temporary page, storing a first break instruction in the first address, in place of the first function instruction, executing the first break instruction in the first address, executing the first function instruction in the second address, executing a second break instruction, and determining a second environment value, wherein the second break instruction is stored in an address that follows the second address.

The method may include a transfer instruction stored in an address that follows the second address and that precedes the address of the second break instruction. The transfer instruction may enable a transfer to an address where a second instruction of the function is stored.

The determining of the first environment value may include executing a probe handler in an operating system area.

The determining of the second environment value may be executed after transferring an execution location to a return address, according to execution of a final function instruction.

As described above, in dynamically tracing a function forming a program to be analyzed, a processing program to store the detailed result of tracing may be executed in an operating system area. In addition, when the execution of a program to be analyzed is traced, overhead may be minimized.

Other features and aspects may become apparent to those skilled in the art from the following detailed description, the drawings, and the claims.

BRIEF DESCRIPTION OF THE DRAWINGS

Unless otherwise noted, elements, features, and structures are denoted by the same reference numerals throughout the drawings and the detailed description. The relative size and proportions of some elements may be exaggerated in the drawings for clarity, illustration, and convenience.

DETAILED DESCRIPTION

The following detailed description is provided to assist the reader in gaining a comprehensive understanding of the methods, apparatuses, and/or systems described herein. Various changes, modifications, and equivalents of the systems, apparatuses and/or methods described herein may suggest themselves to those of ordinary skill in the art. Descriptions of well-known functions and structures may be omitted to enhance clarity and conciseness.

Hereinafter, examples will be described with reference to accompanying drawings.

Figure 1:
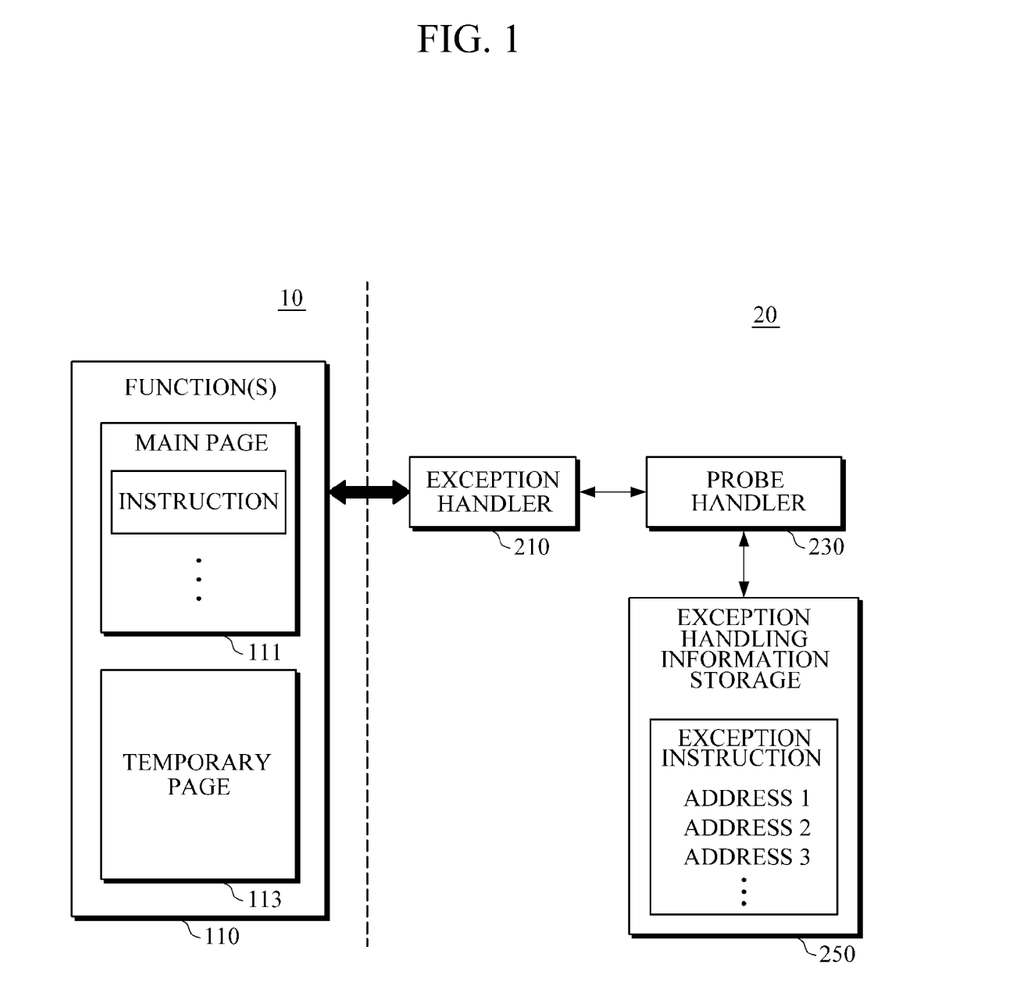
FIG. 1 is a diagram illustrating an example of exception handling of dynamic analysis.

FIG. 1 is a diagram illustrating an example of exception handling of dynamic analysis.

As illustrated in FIG. 1, an application area 10 includes at least one function 110 associated with running an application program. Function 110 may include various types of instructions to execute the application program. If at least one predetermined function to be analyzed is present in function 110, a main page 111, including instructions forming function 110 to be analyzed, is loaded to a system memory such that function 110 is executed. Furthermore, it is not necessary that all instructions of function 110 are included in the main page 111. The instructions of function 100 to be analyzed may be provided on a plurality of pages and/or executed in a sequence of pages.

In executing function 110, a system call and a handler may be executed in an operating system area 20 in addition to the application area 10. That is, in order to trace the entry of a function into the operating system area 20, a processing program may be executed to store the information of tracing in the operating system area 20. In this manner, a program to be analyzed is traced while operation of the operating system supporting execution of the program is also traced.

Meanwhile, a predetermined process may be used for the entry of function 110 of the application area 10 into the operating system area 20; this predetermined process may be referred to as an exception. If an exception occurs, an exception handler 210 is invoked and a probe handler 230 is executed. The exception handler 210 determines the exception and invokes the probe handler 230. The probe handler 230 performs procedures related to the exception according to an exception instruction 212 and various probe point address information stored in an exception handling information storage 250.

FIGS. 2A to 2H are diagrams illustrating examples of dynamic analysis operations.

Figure 2A:
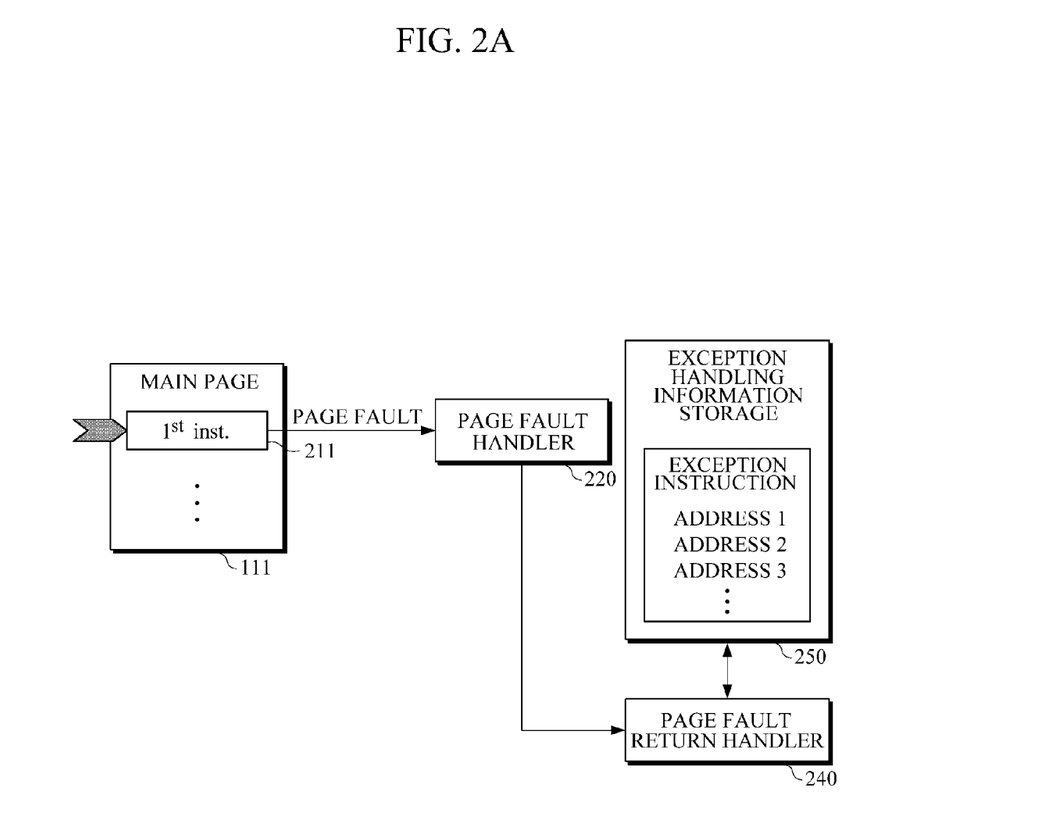
FIGS. 2A to 2H are diagrams illustrating examples of dynamic analysis operations.

As illustrated in FIG. 2A, when execution of function 110 is commenced, a first instruction 211 is executed. The first instruction is located at a first address of function 110, corresponding to a first instruction location. However, if the main page 111, including the first instruction 211, has not been loaded to a system memory, a page fault may occur. If a page fault occurs, a page fault handler 220 is executed, and loads the corresponding page to the system memory. The page fault handler 220 executes a page fault return handler 240.

Figure 2B:
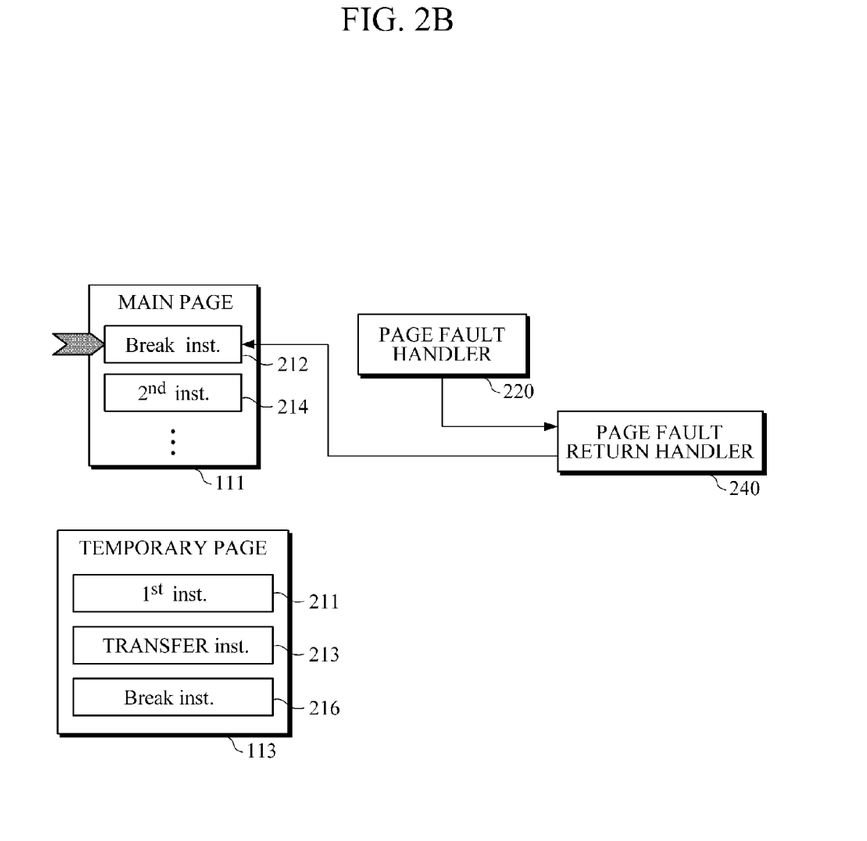

As illustrated in FIG. 2B, the page fault return handler 240 generates a temporary page 113 in response to the system memory load fault of the main page 111. The page fault return handler 240 also copies the first instruction 211 of the main page 111, and stores the first instruction 211 in a first address of the temporary page 113. In addition, the page fault return handler 240 inserts a break instruction 212 at an address of the first instruction 211 of the main page 111. Accordingly, the break instruction 212 of the main page 111 is stored in the address of the first instruction 211 of the main page 111, and instructions that follow, for example a second instruction 214 and additional instructions, are stored after the break instruction 212.

The page fault return handler 240 stores the first instruction 211 of the main page 111 in the first address of the temporary page 113, stores a transfer instruction 213 in a second address of the temporary page 113. The transfer instruction 213 enables transferring to an address where the second instruction 214 of the main page 111 is stored. The page fault return handler 240 also stores a break instruction 216 of the temporary page 113 in a third address of the temporary page 113. In this manner, the break instruction 212 is inserted into the location of the first instruction 211 in the main page 111 and the first instruction 211 is stored in the temporary page 113. Accordingly, the first instruction 211, which is not stored in its original location in the main page 111, may perform essentially the same operation as if it were stored in its original location of the main page 111.

The page fault return handler 240 generates the temporary page 113 and returns execution to the first address of the main page 111. Accordingly, the break instruction 212 of the main page 111, stored in the first address of the main page 111, is executed. Details thereof are described below with reference to FIG. 2C.

Figure 2C:
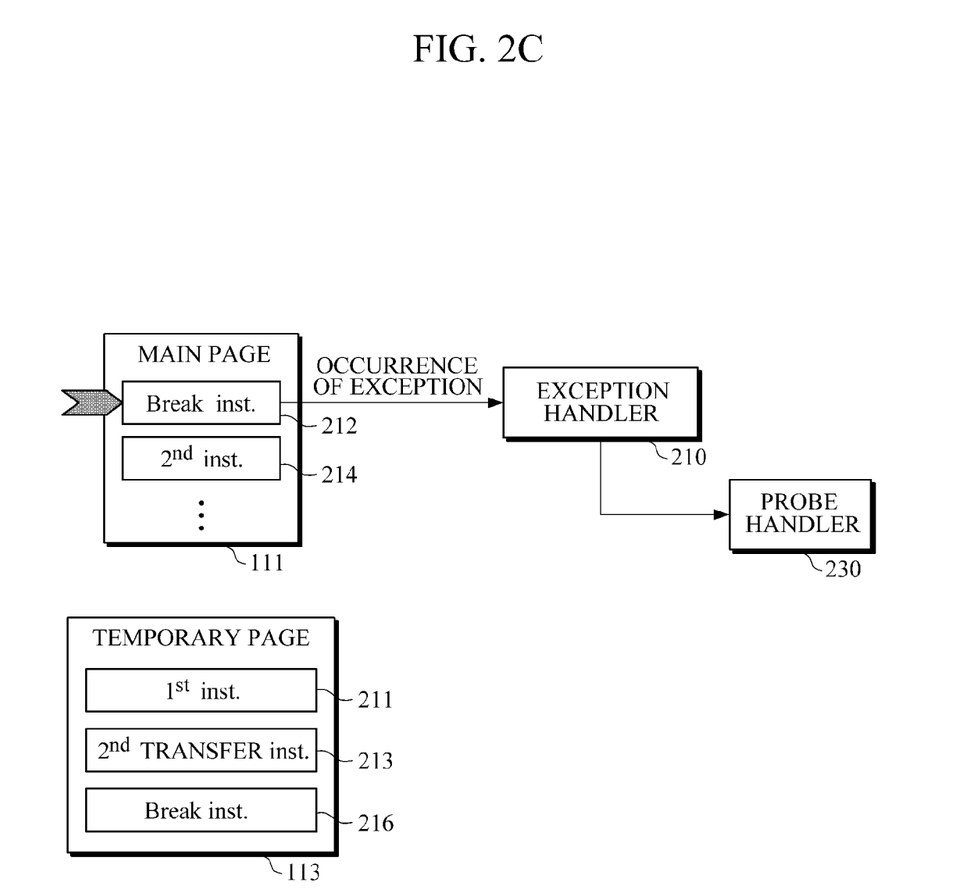

As illustrated in FIG. 2C, the break instruction 212 of the main page 111, inserted into the first address of the main page 111, is executed. As the break instruction 212 is executed, an exception occurs and the exception handler 210 is invoked. The probe handler 230 is invoked by the exception handler 210. The probe handler 230 determines an environment value before execution of function 110 and stores the environment value in a database. The environment value represents various types of values that may be used to detect errors of a program, and the environment value may include register values, variables, and the position of a stack.

Figure 2D:
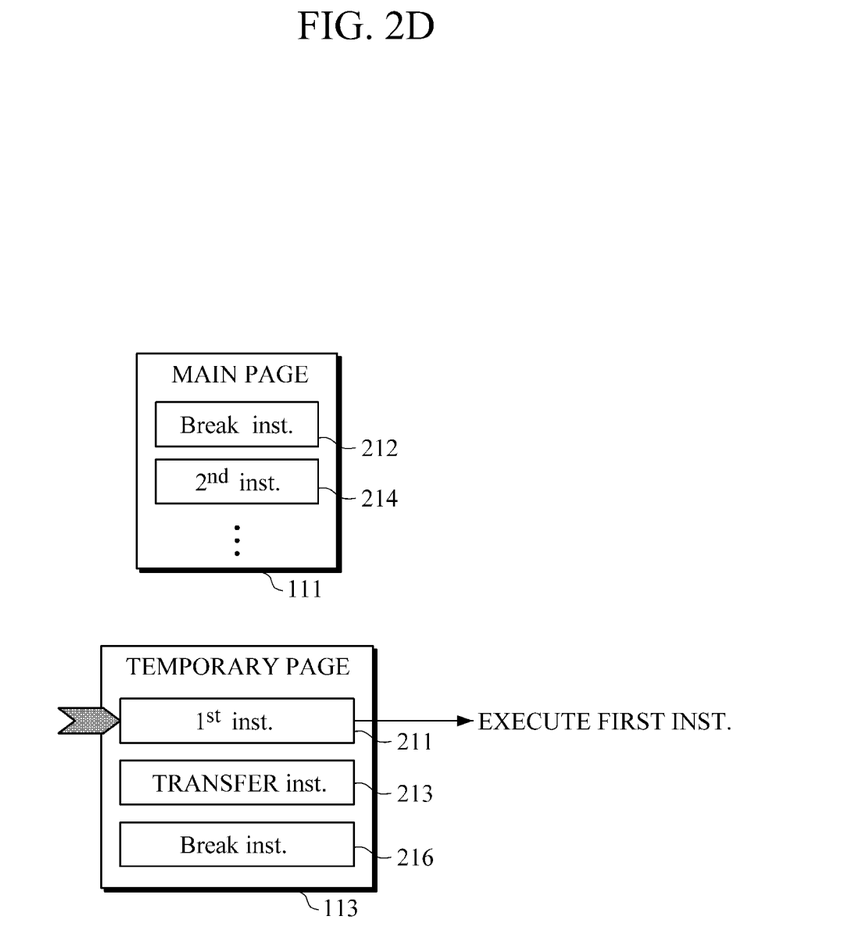

The probe handler 230 changes a return address of function 110 to a first location value of the temporary page 113. As a result, an instruction stored at the first address of the temporary page 113 is executed after execution of the break instruction 212 of the main page 111. In this case, the first instruction 211 of the main page 111 is copied to the first location of the temporary page 113, such that the first instruction is executed as illustrated in FIG. 2D.

Figure 2E:
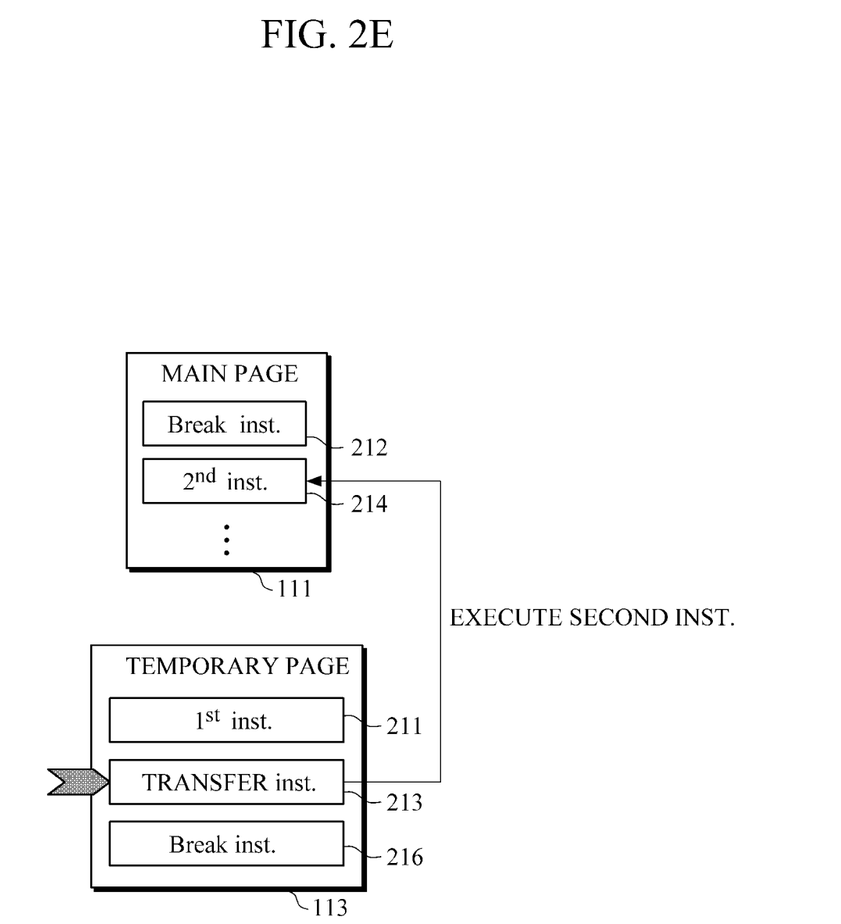
Figure 2F:
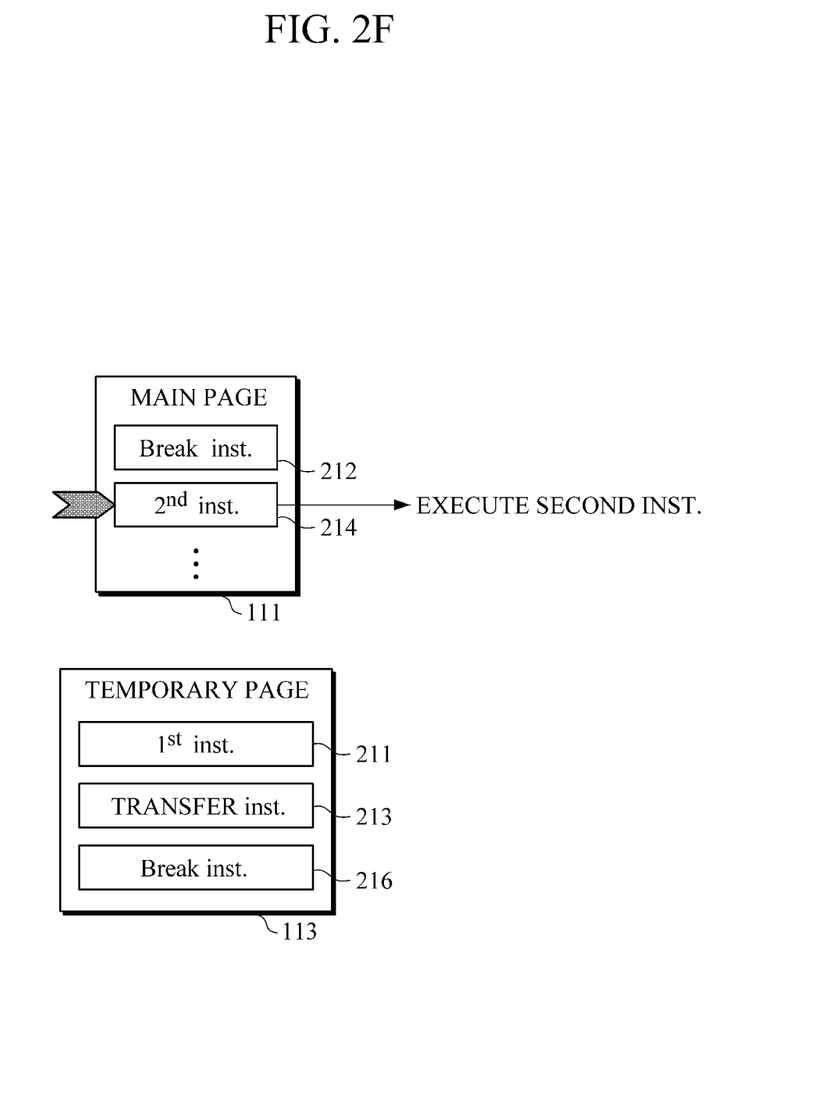

As illustrated in FIG. 2E, execution proceeds with an instruction stored at a second instruction address of the temporary page 113. As described above, the transfer instruction 213 enables a transfer to a location where the second instruction of the main page 111 is stored. The transfer instruction 213 is stored in the second instruction location of the temporary page 113. According to the execution of the transfer instruction 213, the second instruction 214 stored in the second instruction location in the main page 111 may be executed. The execution of the second instruction 214 of the main page 111 is illustrated in FIG. 2F.

Figure 2G:
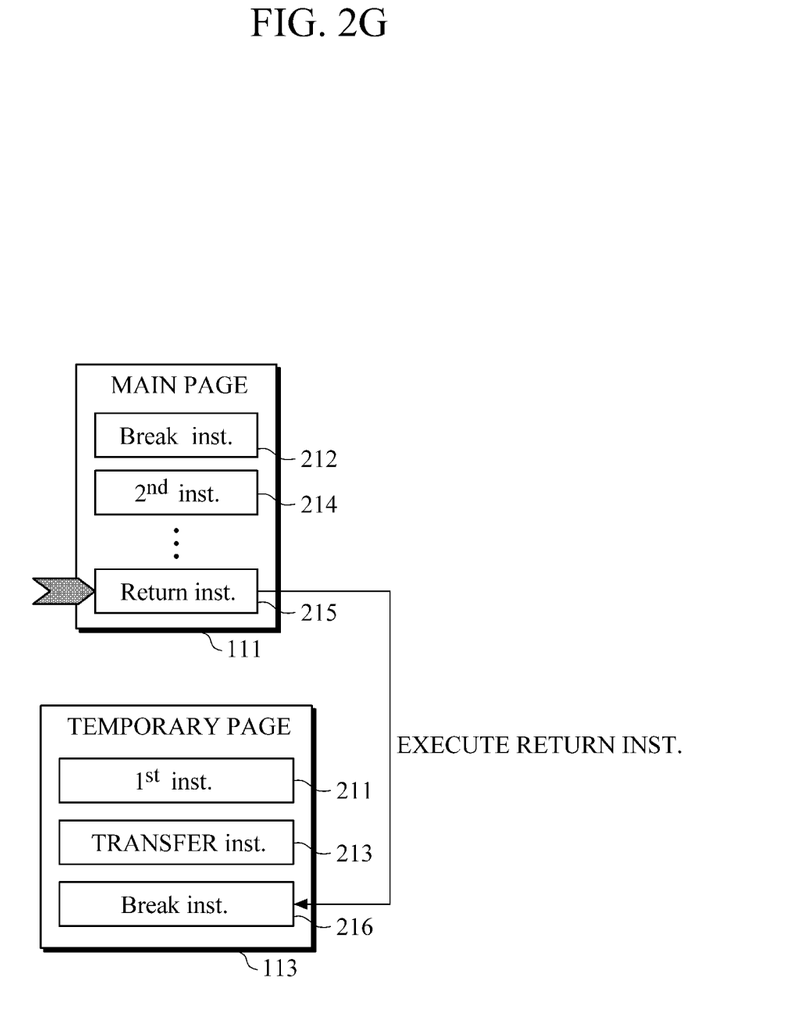

Thereafter, other instructions stored in the main page 111 may be sequentially executed. A return instruction 215 corresponding to a final instruction of function 110 may be executed. The return instruction 215 instructs a return to the temporary page 113. In this case, as illustrated in FIG. 2G, the return instruction 215 provides a return to a third instruction address of the temporary page 113. The third instruction address of the temporary page 113 stores the break instruction 216 of the temporary page 113. According to execution of the return instruction 215, execution is moved from the main page 111 to the temporary page 113.

Figure 2H:
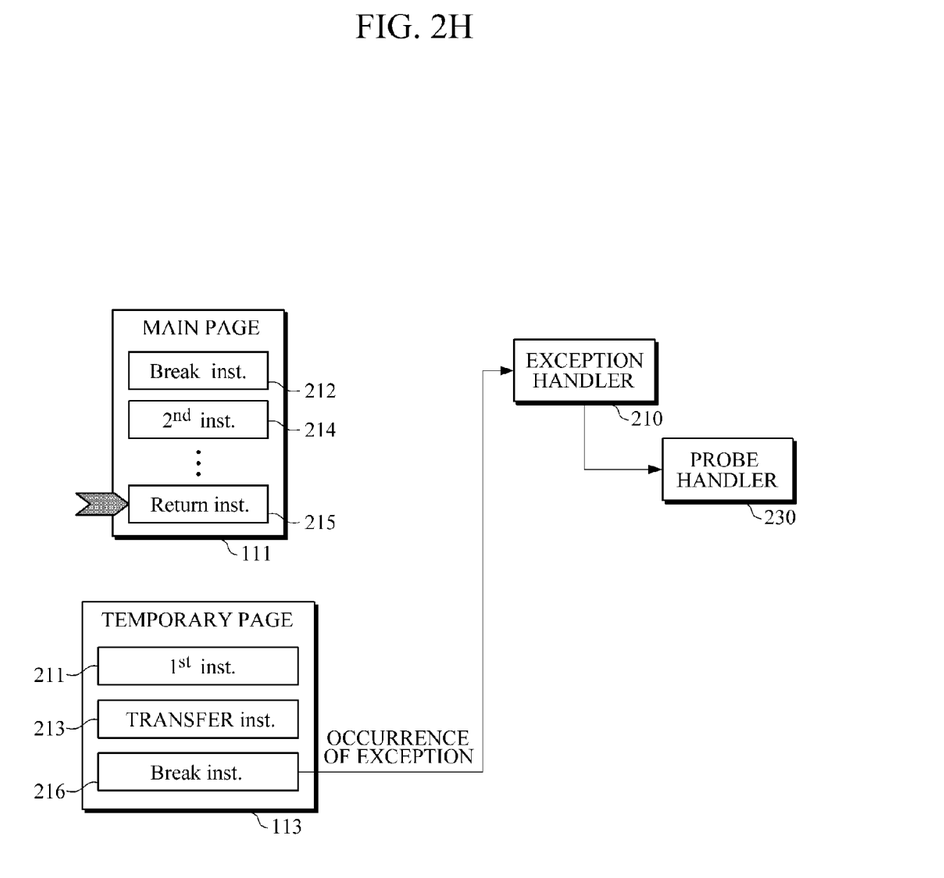

As illustrated in FIG. 2H, the break instruction 216 stored in the third instruction address of the temporary page 113 is executed. According to the execution of the break instruction 216, an exception occurs, the exception handler 210 is invoked, and the probe handler 230 is invoked by the exception handler 210. The probe handler 230 determines an environment value after execution of function 110, and stores the environment value. The environment value represents various types of values that may be used to detect errors of a program, and the environment value may include register values, variables, and the position of a stack. In this manner, the environment value after execution of function 110 may be obtained.

Figure 3:
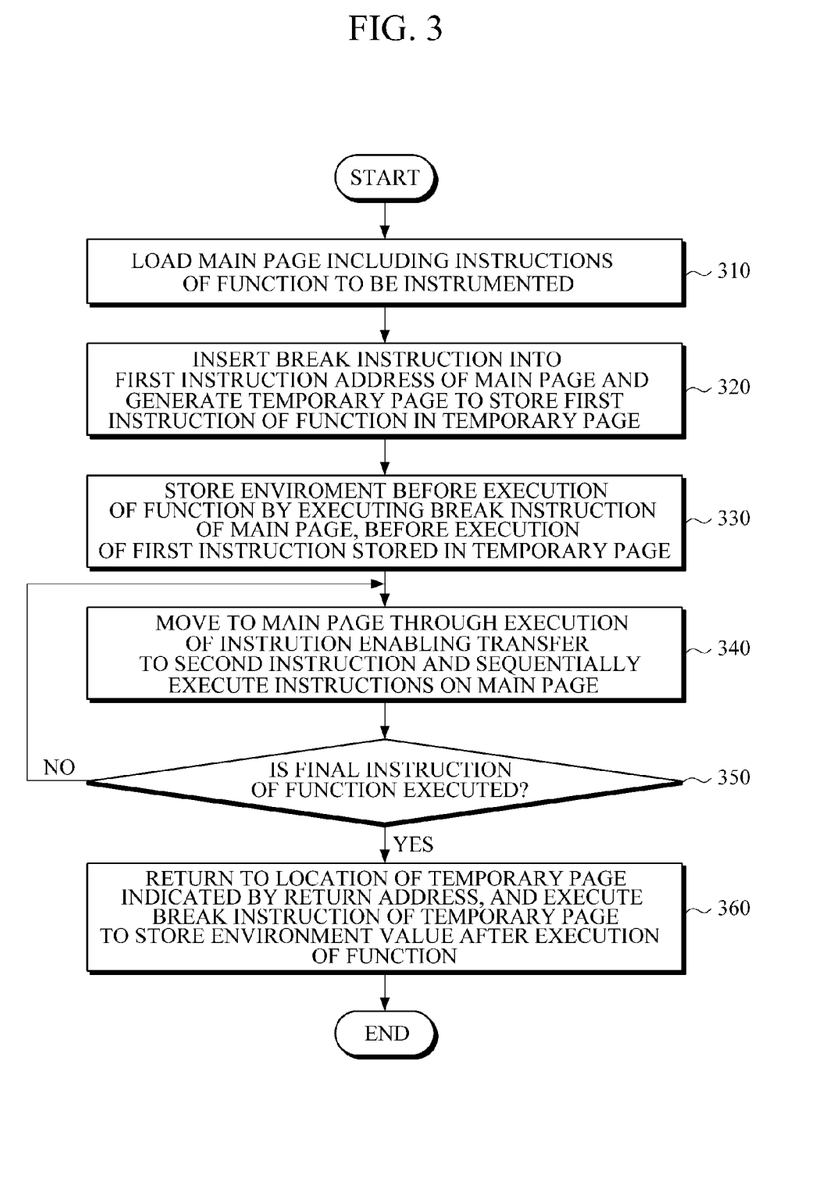
FIG. 3 is a flowchart illustrating an example of a method of dynamic analysis.

FIG. 3 is a flowchart illustrating an example of a method of dynamic analysis.

Referring to FIG. 3, in conjunction with FIG. 2A to 2H, the main page 111, including instructions of function 110 forming a program, is loaded to a memory (operation 310). The page fault handler 220 may be used for loading of the main page 111, as illustrated in FIG. 2A.

The page fault return handler 240 is executed (operation 320). According to the execution of the page fault return handler 240, the first instruction 211 of function 110, corresponding to the first instruction location of the main page 111, is copied and the break instruction 212 is inserted into the location of the first instruction 211 of the main page 111. Further, the break instruction 212 is executed, the temporary page 113 is generated, and the first instruction 211 is stored at the first location of the temporary page 113. If the break instruction 212 in the main page 111 is executed, the environment value before execution of function 110 is determined and stored by the probe handler 230, which is invoked by the exception handler 210 of the operating system area 20 (operation 330).

The page fault return handler 240 sets a return address to the first instruction address of the temporary page 113, such that the first instruction 211 at the first instruction address of the temporary page 113 is executed. The transfer instruction 213 at the second instruction address of the temporary page 113 is executed, so that the second instruction 214 at the second instruction location of the main page 111 is executed; other instructions on the main page 111 are sequentially executed (operation 340). In this manner, while all instructions forming the function 110 are executed, the program may be dynamically analyzed without substantially affecting the operation of function 110 at run time.

It is determined whether the final instruction of the main page 111 is executed (operation 350). If the execution is completed up to the final instruction, execution is moved to a location indicated by the return instruction such that the break instruction 216 at the third instruction address of the temporary page 113 is executed to store an environment value after execution of the function 110 (operation 360). As described above, the environment values before and after execution of function 110 may be detected without substantially affecting the operation of the function 110 and the obtained environment values are used to analyze the program.

Figure 4:
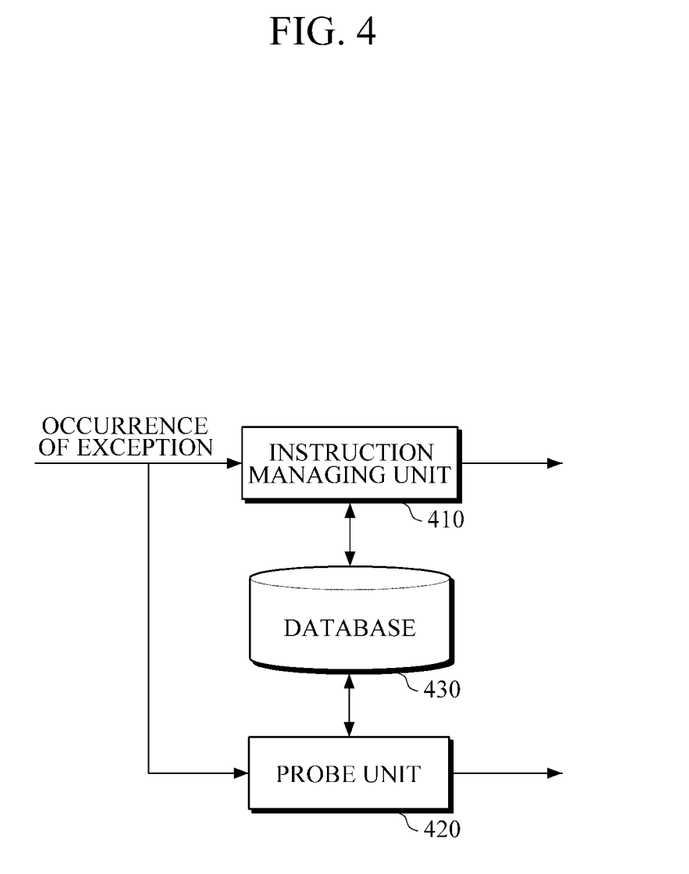
FIG. 4 is a block diagram illustrating an example of an apparatus for dynamic analysis.

FIG. 4 is a block diagram illustrating an example of an apparatus for dynamic analysis.

As illustrated in FIG. 4, a dynamic analysis apparatus may include a probe unit 420, an instruction managing unit 410 and a database. The instruction managing unit 410 is configured to store instructions of function 110 forming the program in the temporary page 113, and to insert the break instruction 212. That is, the instruction managing unit 410 manages instructions such that the first instruction 211 at the first instruction location of the main page 111 is copied, the copied first instruction 211 is stored in the temporary page 113, the break instruction 212 is inserted into the first instruction address of the main page 111, the break instruction 212 is executed, and execution proceeds to the return address such that the exception instruction 216 is executed if the final instruction of function 110 is executed. As illustrated in FIGS. 2A to 2H, the execution of instructions are performed while moving between the main page 111 and the temporary page 113.

The probe unit 420 detects the environment values of the function 110 through execution of the break instruction 212 and 216 and stores the detected environment values. That is, the environment value before execution of function 110 is detected through execution of the break instruction 212 inserted into the address of the first instruction forming the function 110. The environment value after execution of function 110 is detected through execution of the break instruction 216 inserted into the return address of function 110. In this case, the database 430 may store the break instructions 212 and 216 and probe point address information.

The instruction managing unit 410 and the probe unit 420 may be implemented by the probe handler 230 that is executed by the exception hander 210 of the operating system area.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of the computer readable recording medium include hardware devices that are specially configured to store and perform program instructions, such as read-only memory (ROM), random-access memory (RAM), flash memory, and the like; optical media such as CD-ROM disks and DVDs, magnetic tapes, floppy disks; magnetic media, such as hard disks, floppy disks, and magnetic tape; and magneto-optical media, such as optical disks. Examples of program instructions include machine code, such as produced by a compiler, and files containing higher level code that may be executed by the computer using an interpreter. The described hardware devices may be configured to act as one or more software modules in order to perform the operations and methods described above, or vice versa. The computer readable recording medium may be distributed among network-coupled computer systems and computer readable code or program instructions may be stored and executed in a distributed fashion.

Also, functional programs, codes, and code segments for accomplishing the features described above may be constructed by programmers skilled in the art to which the present invention pertains. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computer implemented method of dynamically analyzing a program, the computer implemented method causing the computer to execute steps comprising:
   storing an environment value before an execution of a function of a main page by storing a first instruction of the function in a temporary page before execution of the first instruction, inserting a break instruction of the main page at an address of the first instruction in the main page, and executing the break instruction of the main page; and
   storing the environment value after the execution of the function by executing a break instruction of the temporary page in a return address of the temporary page after a final instruction of the function is executed;
   executing the break instruction of the main page, storing the environment value before execution of the function, and changing a return address of the function to an address of the first function in the temporary page.

2. The method of claim 1, wherein the first instruction of the function, a transfer instruction, and the break instruction of the temporary page are sequentially stored and executed in the temporary page,
   wherein the transfer instruction enables a transfer to an address where a second instruction of the function is stored.

3. The method of claim 2, wherein the storing of the environment value before the execution of the function comprises:
   storing the first instruction of the function in the temporary page and inserting the break instruction of the main page at the address of the first instruction in the main page.

4. The method of claim 3, further comprising:
   executing the first instruction stored in the temporary page;
   executing an instruction to transfer to the address where the second instruction of the function is stored; and
   sequentially executing other instructions of the function after the executing of the second instruction of the function.

5. The method of claim 2, wherein the storing of the environment value after execution of the function comprises:
   transferring an execution location to the return address according to the final instruction of the function; and
   determining the environment value after execution of the function in an operating system area as the break instruction of the temporary page is executed,
   wherein the return address represents an address of the break instruction of the temporary page, after the final instruction of the function is executed.

6. The method of claim 1, wherein, in response to the break instruction of the main page being executed, a probe handler is executed by an exception handler in an operating system area to determine and store the environment value of the function.

7. The method of claim 1, wherein: the first instruction of the function is stored in the temporary page such that the break instruction of the main page is stored in the main page instead of the first instruction, the break instruction of the main page is executed, and the first instruction stored in the temporary page is executed.

8. The method of claim 1, wherein a processing program is executed to store information of tracing in an operating system area.

9. A hardware apparatus for dynamically analyzing a program, the apparatus comprising:
   an instruction managing unit configured to store instructions of a function of a main page in a temporary page, and to insert a break instruction in the temporary page; and
   a probe unit configured to detect an environment value of the function according to an execution of the break instruction of the temporary page, and to store the detected environment value;
   executing the break instruction of the main page, storing the environment value before execution of the function, and changing a return address of the function to an address of the first function in the temporary page.

10. The apparatus of claim 9, wherein the instruction managing unit manages the instructions such that a first instruction of the function is stored in the temporary page before execution of the first instruction, a break instruction of the main page is inserted into an address of the first instruction in the main page such that the break instruction of the main page is executed, and a break instruction stored in a return address of the function of temporary page is executed after a final instruction of the function is executed.

11. The apparatus of claim 9, wherein the instruction managing unit executes an instruction to a transfer to an address where a second instruction of the function is stored after the first instruction stored in the temporary page is executed, and sequentially executes other instructions of the function after the second instruction of the function is executed.

12. The apparatus of claim 9, wherein the probe unit detects an environment value before execution of the function by executing the break instruction of the main page, and detects an environment value after execution of the function by executing the break instruction stored in the return address of the function of temporary page.

13. The apparatus of claim 9, wherein the instruction managing unit and the probe unit are implemented by a probe handler that is executed by an exception handler of an operating system area.

14. A computer implemented method of dynamically analyzing a program, the computer implemented method causing the computer to execute steps comprising:
   determining a first environment value;
   copying a first function instruction from a first address, the first address located in a main page;
   storing the first function instruction in a second address, the second address located in a temporary page;
   storing a first break instruction in the first address, in place of the first function instruction;
   executing the first break instruction in the first address;
   executing the first function instruction in the second address;
   executing a second break instruction; and
   determining a second environment value,
   wherein the second break instruction is stored in an address that follows the second address.

15. The method of claim 14, wherein a transfer instruction is stored in an address that follows the second address and that precedes the address of the second break instruction,
   wherein the transfer instruction enables a transfer to an address where a second instruction of the function is stored.

16. The method of claim 14, wherein the determining of the first environment value comprises executing a probe handler in an operating system area.

17. The method of claim 14, wherein the operation of determining the second environment value is executed after transferring an execution location to a return address, according to execution of a final function instruction.

* * * * *